(12) United States Patent
Kim et al.

(10) Patent No.: US 12,109,871 B2
(45) Date of Patent: Oct. 8, 2024

(54) VEHICLE AIR VENT APPARATUS WITH DIRECT AND INDIRECT MULTIFUNCTION

(71) Applicants: HYUNDAI MOBIS Co., Ltd., Seoul (KR); ITW EF&C Korea LLC, Incheon (KR)

(72) Inventors: Seung Cheol Kim, Suwon-si (KR); Chun Ha Kim, Seoul (KR); Yong Seok Park, Seoul (KR)

(73) Assignees: HYUNDAI MOBIS CO., LTD., Seoul (KR); ITW EF&C KOREA LLC., Incheon (KR)

( * ) Notice: Subject to any disclaimer, the term of this patent is extended or adjusted under 35 U.S.C. 154(b) by 232 days.

(21) Appl. No.: 17/321,851

(22) Filed: May 17, 2021

(65) Prior Publication Data

US 2022/0250445 A1    Aug. 11, 2022

(30) Foreign Application Priority Data

Feb. 9, 2021 (KR) ........................ 10-2021-0018685

(51) Int. Cl.
*B60H 1/34* (2006.01)
*B60H 1/00* (2006.01)

(52) U.S. Cl.
CPC ......... *B60H 1/3421* (2013.01); *B60H 1/0065* (2013.01); *B60H 2001/3471* (2013.01)

(58) Field of Classification Search
CPC .... B60H 2001/3471; B60H 2001/3478; B60H 1/0065; F27D 3/026
See application file for complete search history.

(56) References Cited

U.S. PATENT DOCUMENTS

2003/0050001 A1    3/2003  Kamio

FOREIGN PATENT DOCUMENTS

| DE | 60 2005 000 821 T2 | 8/2007 | |
|---|---|---|---|
| DE | 60 2005 005 848 T2 | 5/2009 | |
| DE | 10 2017 118 450 A1 | 2/2019 | |
| EP | 1520738 A1 * | 4/2005 | ........... B60H 1/3421 |
| JP | 2008265386 A * | 11/2008 | |
| JP | 2017030599 A * | 2/2017 | |

(Continued)

OTHER PUBLICATIONS

Original and translation of JP201730599, Ikuta (Year: 2017).*
(Continued)

*Primary Examiner* — Steven S Anderson, II
(74) *Attorney, Agent, or Firm* — Morgan, Lewis & Bockius LLP

(57) ABSTRACT

A vehicle air vent apparatus according to one embodiment of the present invention is an apparatus which guides air introduced from a vehicle air conditioner into a vehicle using a direct wind mode or indirect wind mode. The vehicle air vent apparatus includes a duct part including an entrance and an exit of an air passage communicating with the vehicle air conditioner, a cover part configured to selectively close the exit of the duct part, a vent part configured to adjust a wind direction of air introduced into the vehicle through the exit of the duct part and including a rack disposed under a body of the vent part and extending in a longitudinal front-rear direction of the vehicle, and a driving part configured to change a position of the cover part and a position of the vent part according to a preset logic.

20 Claims, 18 Drawing Sheets

(56) References Cited

FOREIGN PATENT DOCUMENTS

KR        20170137229 A  * 12/2017
WO     WO-2016093660 A1  *  6/2016  ......... B60H 1/00564

OTHER PUBLICATIONS

Hegner et al, EP-1520738-A1 and translation (Year: 2005).*
Office Action issued in corresponding Korean Patent Application No. 1-998-004570-8 dated May 16, 2019 in English Translation.

* cited by examiner

100

VEHICLE AIR VENT APPARATUS WITH DIRECT AND INDIRECT MULTIFUNCTION

CROSS-REFERENCE TO RELATED APPLICATION

This application claims priority to and the benefit of Korean Patent Application No. 10-2021-0018685, filed on Feb. 9, 2021, the disclosure of which is incorporated herein by reference in its entirety.

BACKGROUND

1. Field of the Invention

The present invention relates to a vehicle air vent apparatus with a direct and indirect multifunction.

2. Discussion of Related Art

Currently, in most wing type air vents, a user manipulates a knob to adjust a wind direction of a wing. However, in the wing type air vent of which the wind direction is only manually and directly adjusted by the user, many cases occur in which the wind comes into direct contact with the user's body and causes discomfort.

In order to solve such a problem and apply a next generation slim type cockpit design, various attempts have been made in consideration of designs and functions in the recent vehicle market, but in reality, there are still many things to solve in terms of effectiveness.

SUMMARY OF THE INVENTION

The present invention is directed to providing a vehicle air vent apparatus having a direct and indirect wind function so that a next generation slim type cockpit design is applied thereto.

Objectives to be solved by the present invention are not limited to the above-described objective, other objectives which are not described above will be clearly understood by those skilled in the art through the following specification.

According to one aspect of the present invention, there is provided a vehicle air vent apparatus which guides air introduced from a vehicle air conditioner into a vehicle using a direct wind mode or indirect wind mode. The vehicle air vent apparatus may include a duct part including an entrance and an exit of an air passage communicating with the vehicle air conditioner, a cover part configured to selectively close the exit of the duct part, a vent part configured to adjust a wind direction of air introduced into the vehicle through the exit of the duct part and including a rack disposed under a body of the vent part and extending in a longitudinal front-rear direction of the vehicle, and a driving part configured to change a position of the cover part and a position of the vent part according to a preset logic.

The driving part may slide and move the vent part to the exit of the duct part in the direct wind mode and tilt and move the cover part to the exit of the duct part in the indirect wind mode.

The driving part may include a plurality of actuators respectively positioned at both outer ends of the duct part, a plurality of main gears configured to rotate in conjunction with rotating shafts of the actuators, respectively, a plurality of sub-gears respectively engaged with the main gears to rotate, a plurality of side gears respectively engaged with the sub-gears to rotate, a connecting pin serving as a central axis between the plurality of side gears, and a pinion gear having a central portion connected to the connecting pin. The pinion gear may be engaged with the rack of the vent part and rotate along with the side gears to move the vent part in the longitudinal front-rear direction.

Each of the main gears may include a rotating cam configured to rotate in coaxial conjunction with the rotating shaft of the respective actuator within a preset angle range and including a guide hole, which is disposed at an edge side of the rotating cam and formed in an arch shape along an arc of the edge side, and having a circular sector shape, a cam shaft formed as a central axis of the rotating cam and connecting the rotating shaft of the respective actuator to the rotating cam, and a sawtooth wheel having a central portion connected to the cam shaft to be fixedly positioned on an inner side surface of the rotating cam and configured to transmit a rotating force to the respective sub-gear engaged therewith.

The vehicle air vent apparatus may further include a link part formed as a link structure between the guide hole of the rotating cam and the cover part to be operated in conjunction with each other.

In this case, the cover part may be connected to the link part to selectively open or close the exit of the duct part according to a rotation angle of the rotating cam.

The link part may be disposed between the guide hole of the rotating cam and the cover part and have a structure bent upward at a preset angle.

The link part may include a cover link having a first end fixed to one end of the cover part in a width direction, a guide link having a first end connected to a second end of the cover link, and a cam link having one end fixedly connected to a second end of the guide link and including a connecting protrusions formed to protrude to be moveable in a state in which the connecting protrusion is inserted into the guide hole of the rotating cam.

The guide link and the cam link may be fixedly connected at an angle to be bent upward in a "V" shape.

An angle at which the guide link and the cam link are bent upward may be an obtuse angle.

The guide hole of the rotating cam may have a structure of which an end portion of one side is bent in a "L" shape.

According to another aspect of the present invention, there is provided a vehicle air vent apparatus including a duct part including an entrance and an exit of an air passage communicating with a vehicle air conditioner, a cover part configured to selectively open or close the exit of the duct part at a preset tilting angle, a vent part which is slidably moveable between the entrance and the exit of the duct part in conjunction with a tilting operation of the cover part, a driving part configured to move a position of the vent part, and a link part disposed between the cover part and the driving part and connecting the cover part to the driving part so that the position of the vent part and a position of the cover part are changed relative to each other by the driving part.

The vehicle air vent apparatus may further include a controller configured to control the driving part to be driven according to a preset logic including a direct wind mode in which the vent part moves to the exit of the duct part and an indirect wind mode in which the cover part moves to the exit of the duct part.

The vent part may include a housing including a vent hole communicating with an air passage of the duct part and a rack disposed under a body of the vent part and extending in a longitudinal front-rear direction of a vehicle to be operated in conjunction with the driving part, a plurality of left-right control wings disposed above the vent hole of the housing, a plurality of up-down control wings disposed above the vent hole of the housing and intersecting the left-right control wings, and a knob connected to the left-right control wings and the up-down control wings to serve as a rudder of the left-right control wings and the up-down control wings.

The driving part may include an actuator positioned at one or each of both outer ends of the duct part, a main gear configured to rotate in conjunction with a rotating shaft of the actuator and having a guide hole disposed at an edge side of the main gear and formed in an arch shape along an arc, sub-gears engaged with the main gears to rotate, side gears engaged with the sub-gears to rotate, a connecting pin serving as a central axis of the side gear, and a pinion gear having a central portion connected to the connecting pin. The pinion gear may be engaged with the rack of the housing and rotate along with the side gear to move the housing in the longitudinal front-rear direction.

The link part may include a cover link having a first end fixedly connected to one end of the cover part in a width direction, a guide link having a first end connected to a second end of the cover link, and a cam link having one end connected to a second end of the guide link and including a connecting protrusion disposed at an outer side of the second end of the guide link and formed to protrude so as to be moveable in a state in which the connecting protrusion is inserted into the guide hole of the main gear.

The guide hole of the main gear may have a structure of which an end portion of one side is bent in a "L" shape.

An outer circumferential surface of the connecting pin may be formed in a bent shape, and a contact surface of the side gear connected to the connecting pin and the central portion of the pinion gear may be formed in a shape corresponding to the connecting pin.

According to still another aspect of the present invention, a vehicle air vent apparatus may include a duct part including an entrance and an exit of an air passage communicating with a vehicle air conditioner, a cover part configured to selectively open or close the exit of the duct part by performing a tilting operation, a vent part which is slidably moveable between the entrance and the exit of the duct part in conjunction with the tilting operation of the cover part, a driving part configured to change a position of the cover part and a position of the vent part, and a controller configured to control the driving part to be driven according to a preset logic including a direct wind mode in which the vent part moves to the exit of the duct part and an indirect wind mode in which the cover part moves to the exit of the duct part.

Spacers having guide grooves configured to assist the tilting operation of the cover part may be positioned inside the exit of the duct part.

The vehicle air vent apparatus may further include a link part formed as a link structure between the cover part and the driving part to be operated in conjunction with each other.

In this case, the link part may include guide protrusions formed to protrude from both ends of a surface of the link part facing the cover part in a width direction and corresponding to the guide grooves of the spacers.

The cover part may include a mesh plate forming a body, and a plurality of mesh holes formed in the mesh plate to be spaced apart from each other at intervals.

The cover part may selectively block the exit of the duct part when a position of the cover part is changed to the exit of the duct part and may include blocking membranes disposed at both ends in a width direction and configured to partially or entirely block air, which flows toward an inner side of a vehicle, from being introduced.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
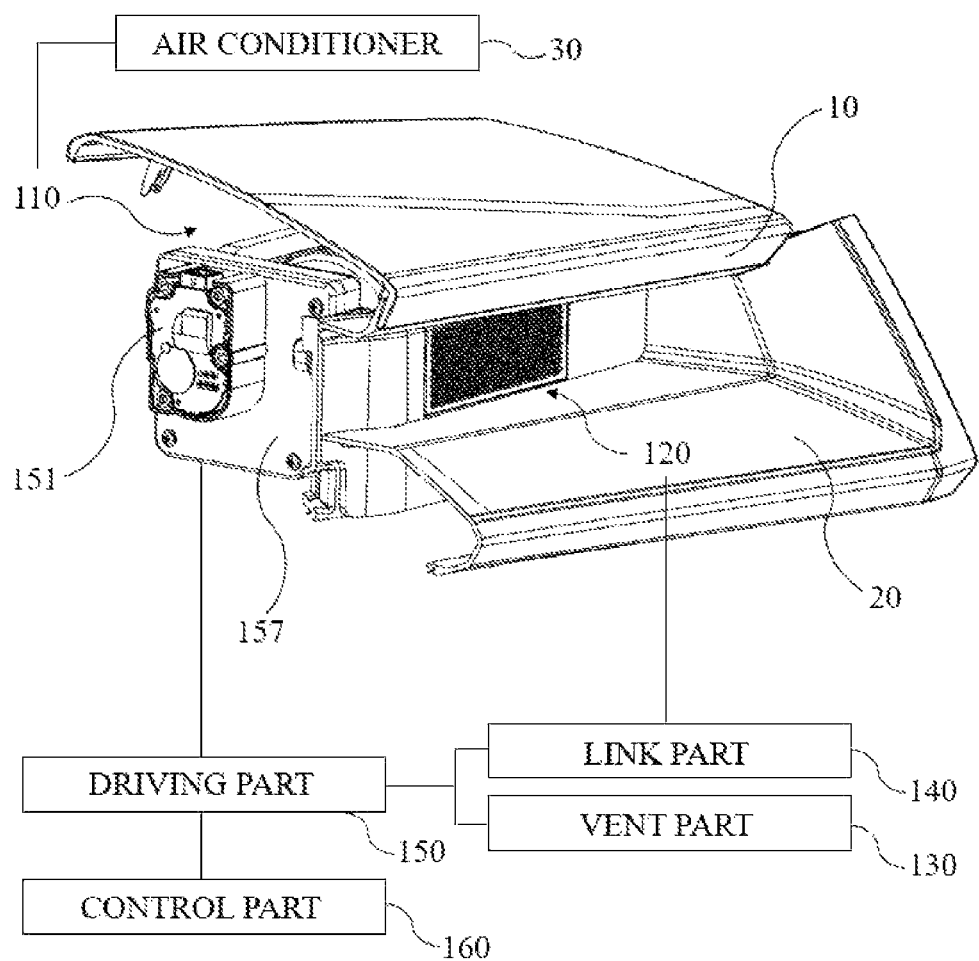
FIG. 1 is a schematic front perspective view illustrating a vehicle air vent apparatus according to one embodiment of the present invention.

Advantages and features of the present invention and methods of achieving the same will be clearly understood with reference to embodiments, which will be described in detail below, and the accompanying drawings. However, the present invention is not limited to the embodiments to be disclosed below and may be implemented in various different forms. The embodiments are provided in order to fully explain the present invention and fully explain the scope of the present invention for those skilled in the art. The scope of the present invention is only defined by the appended claims. Meanwhile, terms used herein are provided only to describe the embodiments of the present invention and are not for purposes of limiting the present invention. Unless the context clearly indicates otherwise, the singular forms include the plural forms. The terms "comprise" and "comprising," when used herein, specify some stated components, steps, operations and/or elements but do not preclude the presence or addition of one or more other components, steps, operations and/or elements.

Hereinafter, embodiments of the present invention will be described in detail with reference to the accompanying drawings.

Basic Structure

FIGS. 1 to 4 are schematic views illustrating a vehicle air vent apparatus according to one embodiment of the present invention when viewed from various angles.

Referring to FIGS. 1 to 4, a vehicle air vent apparatus 100 according to one embodiment of the present invention is installed inside a dashboard in a vehicle and guides air introduced from a vehicle air conditioner 30 into the vehicle while switching a mode to a direct wind mode or indirect wind mode.

In this case, the direct wind mode is a mode allowing wind to blow to a user directly, and the indirect wind mode is a mode allowing wind to blow to the user indirectly or includes a windless mode capable of blocking the wind.

The vehicle air vent apparatus 100 includes a duct part 110, a cover part 120, a vent part 130, a link part 140, a driving part 150, and a controller 160.

The duct part 110 includes an entrance and an exit of an air passage communicating with the vehicle air conditioner 30.

The cover part 120 selectively closes the exit of the duct part 110. For example, in the indirect wind mode, the cover part 120 partially closes the exit of the duct part 110 to guide air introduced from the air conditioner 30 into the vehicle. In the indirect wind mode, since the air does not come into direct contact with the body of a user, needs of the user who does not want direct wind may be satisfied.

The cover part 120 may be implemented with a simple design in harmony with upper and lower garnishes 10 and 20.

For example, the cover part 120 may be formed in a mesh form and may also be formed in a form allowing a front surface to be closed so that a windless mode is possible. The cover part 120 may have any shape which is formed in a design in harmony with surrounding structures.

The vent part 130 has a function of adjusting a wind direction of the air introduced into the vehicle through the exit of the duct part 110. A position of the vent part 130 is changed to the exit of the duct part 110 in the direct wind mode.

The vent part 130 may be slidably moved in a longitudinal front-rear direction so that the position may be changed. In this case, a front direction denotes a direction toward the entrance of the duct part 110, and a rear direction denotes a direction toward the exit of the duct part 110.

A longitudinal direction denotes a direction of a virtual line connecting the entrance and the exit of the duct part 110, and a width direction, which will be described below, denotes a direction perpendicular to the longitudinal direction.

The vent part 130 may include a rack 131b disposed under a housing 131 forming a body in the longitudinal front-rear direction. In addition, the vent part 130 also includes a plurality of left-right control wings 132 disposed above a vent hole 131a of the housing 131 and formed to be spaced apart from each other at intervals in the width direction.

The link part 140 connects the cover part 120 and the driving part 150 using a link structure. The link part 140 will be described in detail with reference to the following drawings.

The driving part 150 may change a position of the cover part 120 and a position of the vent part 130. The driving part 150 slides and moves the vent part 130 to the exit of the duct part 110 in the direct wind mode and tilts and moves the cover part 120 toward the exit of the duct part 110 in the indirect wind mode.

The controller 160 controls the driving part 150 to be driven according to a preset logic. In this case, the preset logic denotes a logic operation condition including the direct wind mode, in which the vent part 130 moves to the exit of the duct part 110, and the indirect wind mode in which the cover part 120 moves to the exit of the duct part 110. The controller 160 of the apparatus according to an exemplary embodiment of the present disclosure may be a processor (e.g., computer, microprocessor, CPU, ASIC, circuitry, logic circuits, etc.). The controller 160 may be implemented by a non-transitory memory storing, e.g., a program(s), software instructions reproducing algorithms, etc., which, when executed, controls the driving part 150, and a processor configured to execute the program(s), software instructions reproducing algorithms, etc.

Coupling Relationships Between Components

Figure 5:
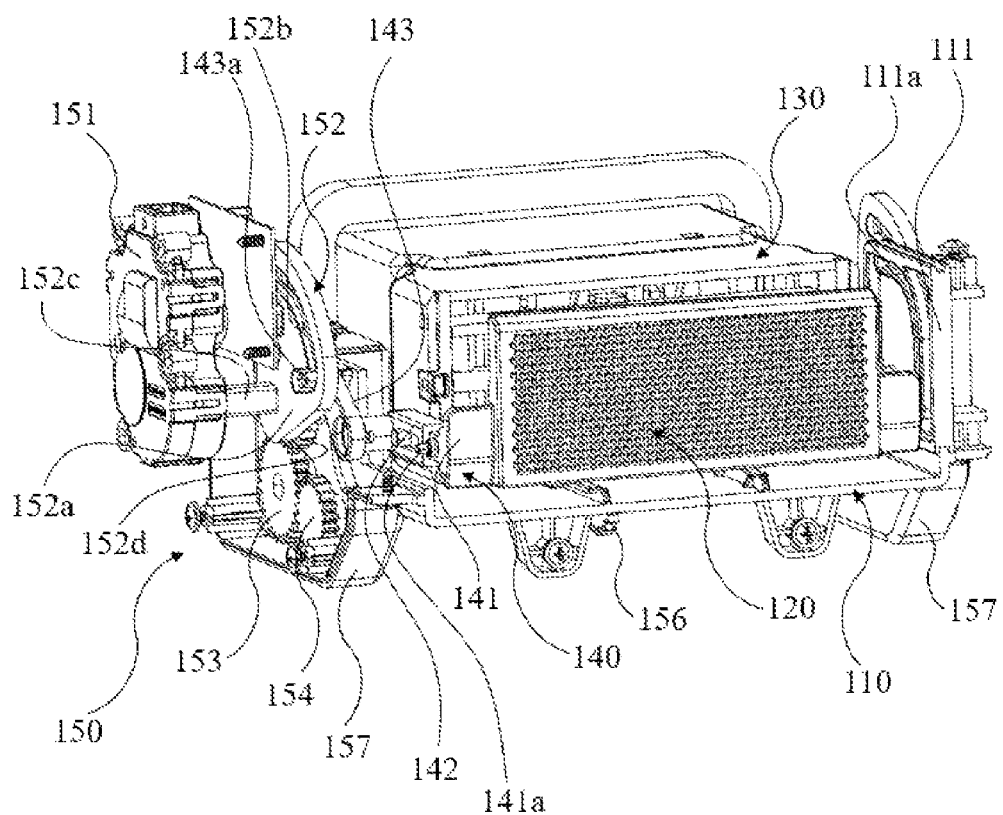
FIG. 5 is a partial front perspective view illustrating the vehicle air vent apparatus according to one embodiment of the present invention, in which some components are hidden in order to describe coupling relationships between components.
Figure 6:
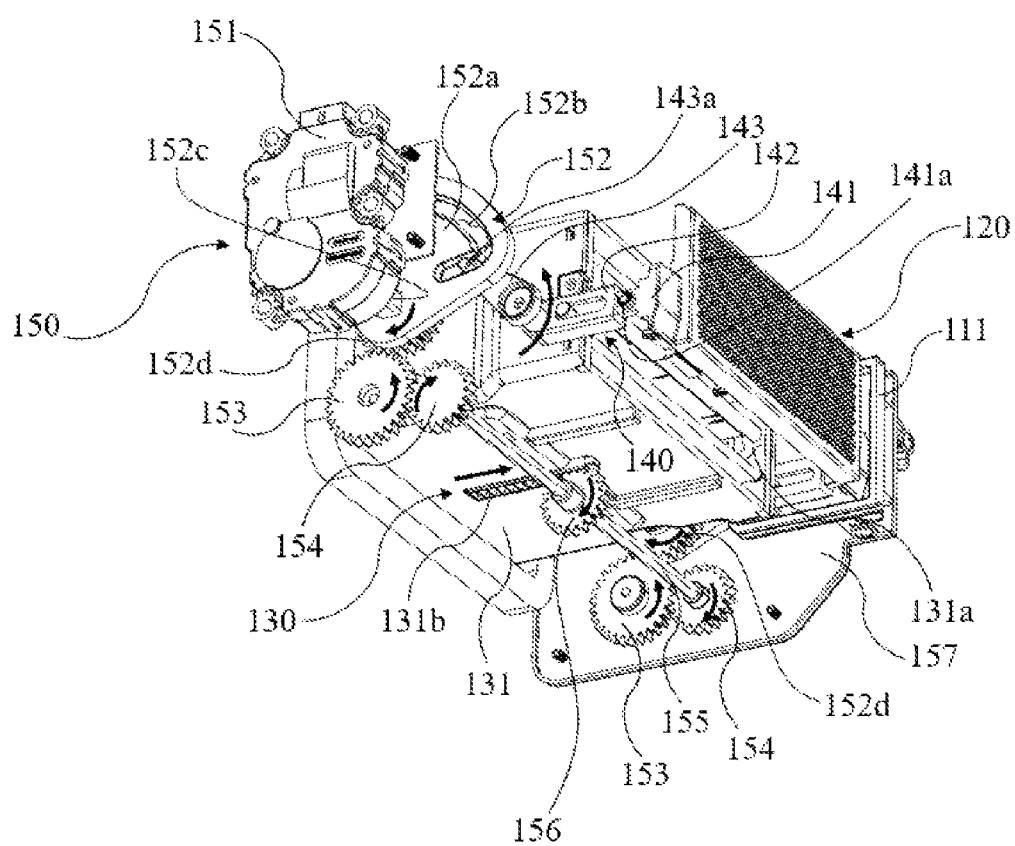
FIG. 6 is a partial perspective view illustrating the undersurface of the vehicle air vent apparatus according to one embodiment of the present invention, in which some components are hidden in order to describe coupling relationships between components.

FIG. 5 is a partial front perspective view illustrating the vehicle air vent apparatus according to one embodiment of the present invention, in which some components are hidden in order to describe coupling relationships between components, and FIG. 6 is a partial perspective view illustrating an undersurface of the vehicle air vent apparatus, in which some components of the vehicle air vent apparatus are hidden.

Referring to FIGS. 5 and 6, the driving part 150 includes actuators 151, main gears 152, sub-gears 153, side gears 154, a connecting pin 155, a pinion gear 156, and protection covers 157.

The actuators 151 are positioned at both outer ends of the duct part 110.

The main gears 152 are positioned at the both outer ends of the duct part 110 along with the actuators 151 to rotate in conjunction with rotating shafts (not shown) of the plurality of actuators 151. The main gears 152 include rotating cams 152a, guide holes 152b, cam shafts 152c, and sawtooth wheels 152d.

The rotating cam 152a rotates in coaxial conjunction with the rotating shaft of the actuator 151 within a preset angle range. In this case, the preset angle range denotes a structural condition in which mode switching is not hindered due to coupling relationships between the components operating in conjunction with each other when the direct wind mode and the indirect wind mode are switched.

The rotating cam 152a is basically formed in a sector shape and includes a guide hole 152b disposed at an edge side thereof and formed in an arch shape along an arc.

The guide hole 152b may have a structure of which an end portion of one side is bent in a "L" shape.

The cam shaft 152c is formed as a central axis of the rotating cam 152a to serve to connect the rotating shaft of the actuator 151 and the rotating cam 152a. Since a cross section of the cam shaft 152c has a quadrilateral shape in which an outer surface of the cam shaft 152c is bent, the cam shaft 152c may be fixed to the rotating cam 152a without shaking. In addition, the cam shaft 152c may be connected to the rotating shaft of the actuator 151 in the form of covering the rotating shaft or using a separate medium. As another example, instead of the cam shaft 152c, the rotating shaft of the actuator 151 may be formed to pass through a central portion of the rotating cam 152a.

A central portion of the sawtooth wheel 152d is connected to the cam shaft 152c so that the sawtooth wheel 152d is fixedly positioned inside the rotating cam 152a. Accordingly, the sawtooth wheel 152d rotates in conjunction with the rotating cam 152a. The sawtooth wheel 152d transmits a rotating force to the sub-gear 153.

The sub-gear 153 is engaged with the sawtooth wheel 152d of the main gear 152 to rotate. In this case, the sub-gear 153 rotates in a direction opposite to a direction in which the sawtooth wheel 152d of the main gear 152 rotates.

The side gear 154 is engaged with the sub-gear 153 to rotate. In this case, the side gear 154 rotates in a direction opposite to the direction of the rotation of the sub-gear 153. In addition, the side gear 154 rotates in the direction which is the same as the direction of the rotation of the sawtooth wheel 152d.

The connecting pin 155 serves as a central axis between the plurality of side gears 154. In this case, the connecting pin 155 is formed as a polygonal shape in which an outer surface (outer circumferential surface) connected to the side gear 154 is bent so that the side gear 154 does not vainly rotate. To this end, a contact surface of a central portion of each of the side gears 154 and the pinion gear 156 may be formed of a shape corresponding to the connecting pin 155.

A central portion of the pinion gear 156 is connected to the connecting pin 155 to be engaged with the rack 131b of the vent part 130. The pinion gear 156 may rotate along with the side gear 154 to move the vent part 130 in the front-rear direction.

The protection cover 157 may function to surround components of the vent part 130 and have a detachable structure in which inner assembly and coupling of the components are facilitated.

The link part 140 forms a link structure between the guide hole 152b of the rotating cam 152a and the cover part 120 to operate in conjunction with each other. The link part 140 may have a structure bent upward at a preset angle between the guide hole 152b and the cover part 120. In this case, the preset angle may be an obtuse angle.

The link part 140 includes cover links 141, guide links 142, and cam links 143.

One ends of the cover links 141 are fixedly connected to both ends of the cover part 120 in the width direction. The cover links 141 include guide protrusions 141a corresponding to guide grooves 111a formed along arcs disposed at edges of spacers 111.

The guide protrusions 141a may move in the guide grooves 111a in a state in which the guide protrusions 141a are inserted into the guide grooves 111a of the spacers 111 when the cover part 120 tilts. In this case, the cover part 120 is connected to the link parts 140 to close or open the exit of the duct part 110 according to rotation of the rotating cams.

One ends of the guide links 142 are fixedly connected to the other ends of the cover links 141.

One ends of the cam links 143 are fixedly connected to the other ends of the guide links 142. The other ends of the cam links 143 are connected to the rotating cams 152a.

In this case, the other ends of the cam links 143 include connecting protrusions 143a formed to protrude so as to be moveably inserted into the guide holes 152b of the rotating cams 152a. In this case, the guide links 142 are fixedly connected to the cam links 143 in a "V" shape bent upward.

In addition, the cam links 143 may include rotating shafts (not shown) to be rotatable at designated positions inside the spacers 111. Accordingly, the cam links 143 may rotate in a forward or reverse direction based on the rotating shafts.

Figure 7:
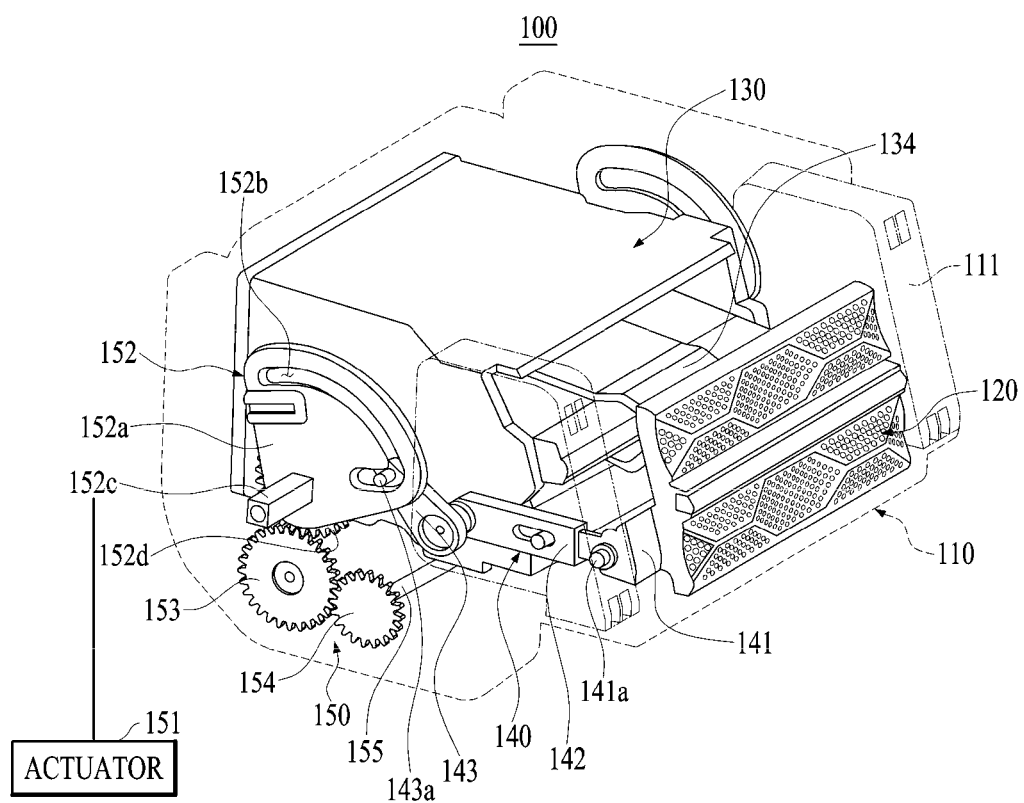
FIG. 7 is a schematic view illustrating an example in which the vehicle air vent apparatus is operated in an indirect wind mode according to one embodiment of the present invention.
Figure 8:
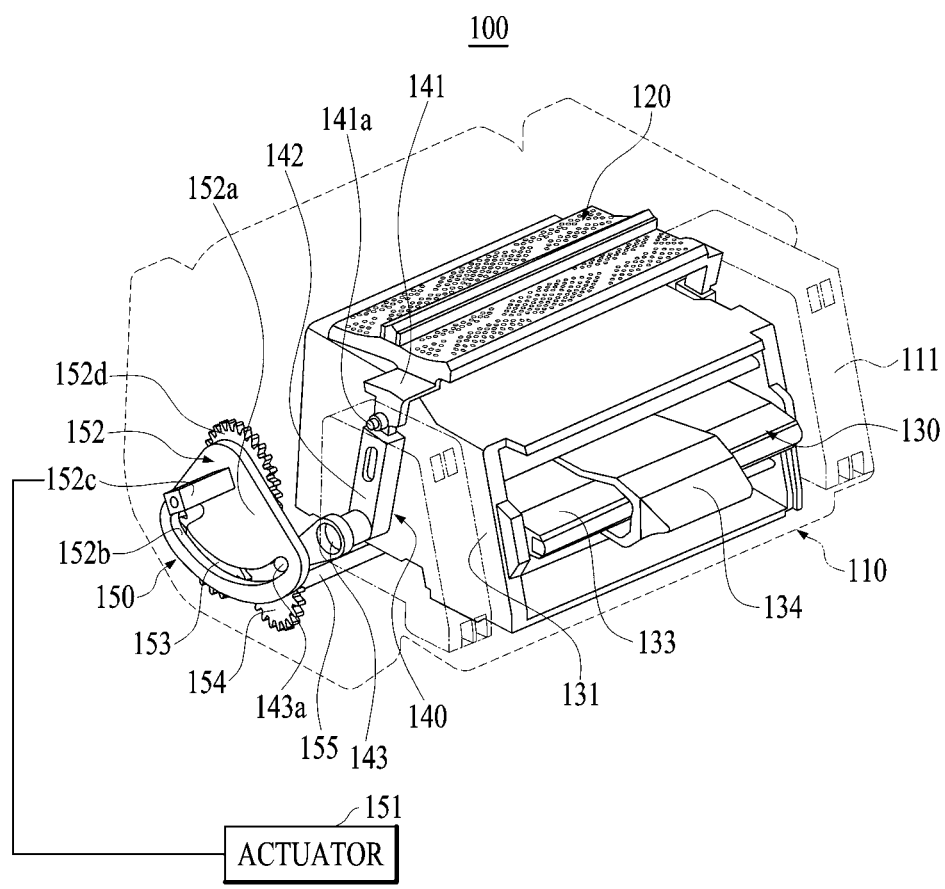
FIG. 8 is a schematic view illustrating an example in which the vehicle air vent is operated in a direct wind mode apparatus according to one embodiment of the present invention.
Figure 9:
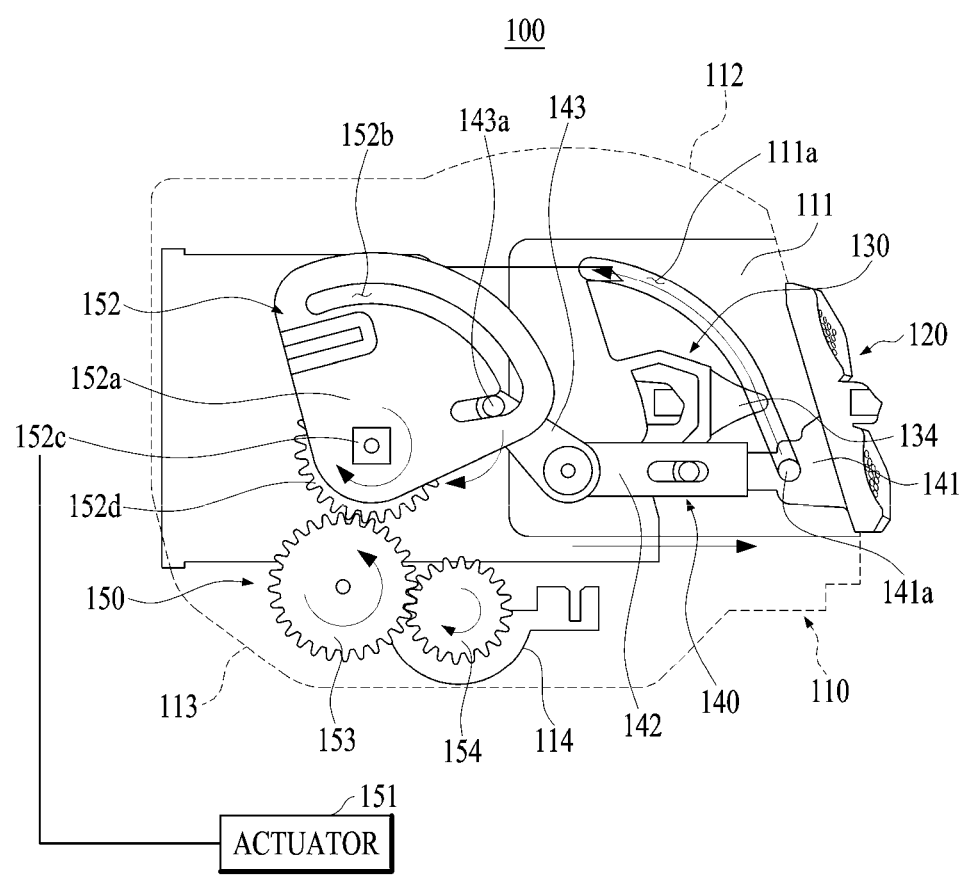
FIGS. 9 to 16 are schematic views illustrating operating relationships between the components when the indirect wind mode is switched to the direct wind mode in the vehicle air vent apparatus according to one embodiment of the present invention.
Figure 10:
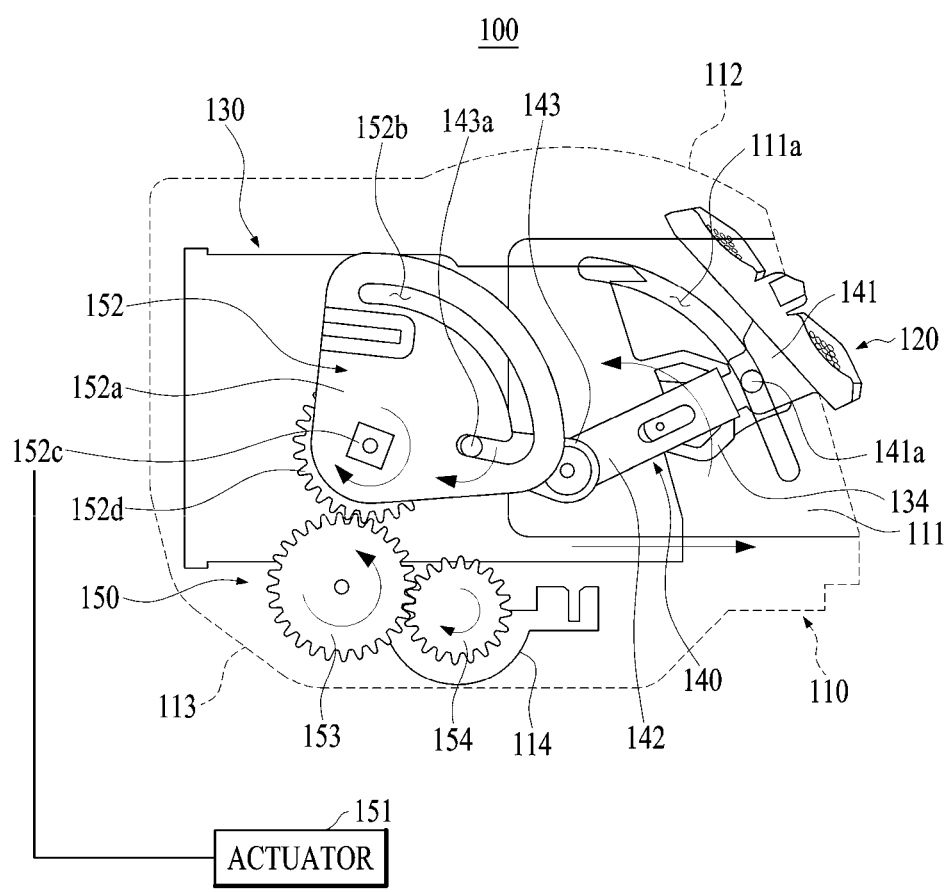
Figure 11:
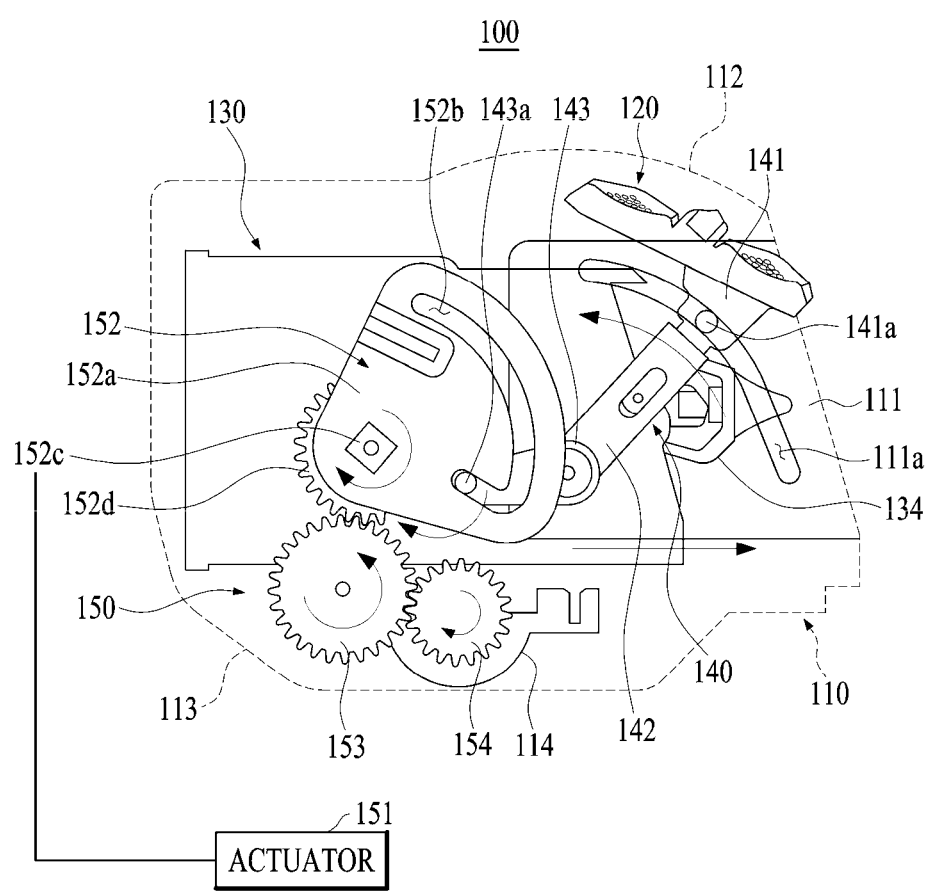
Figure 12:
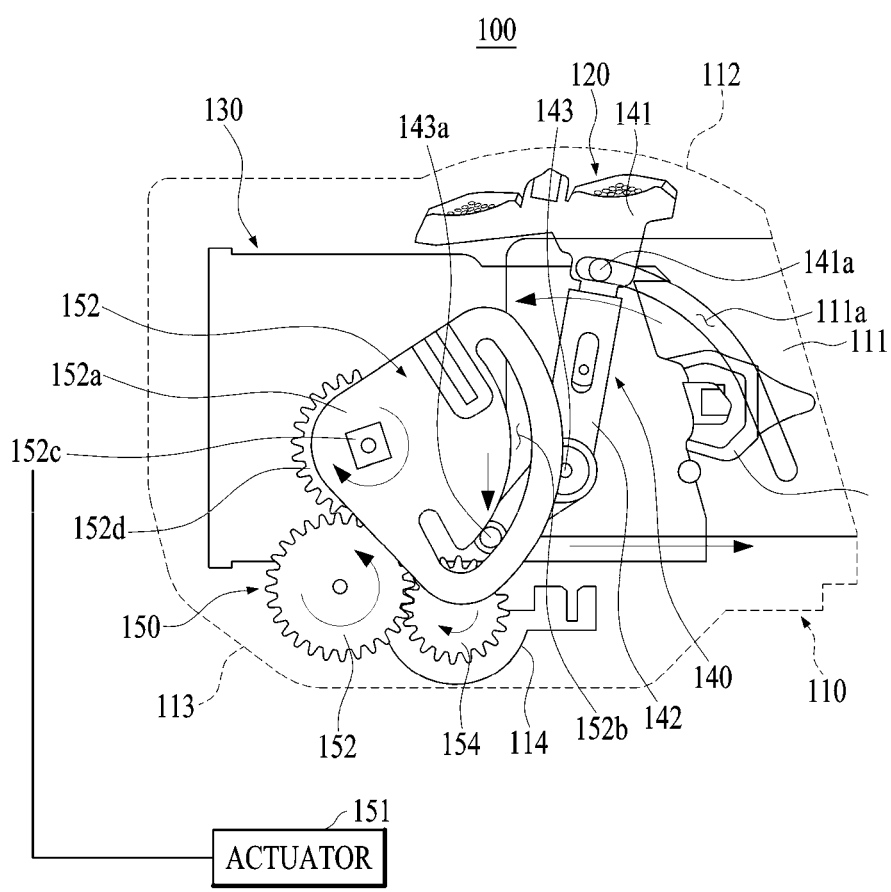
Figure 13:
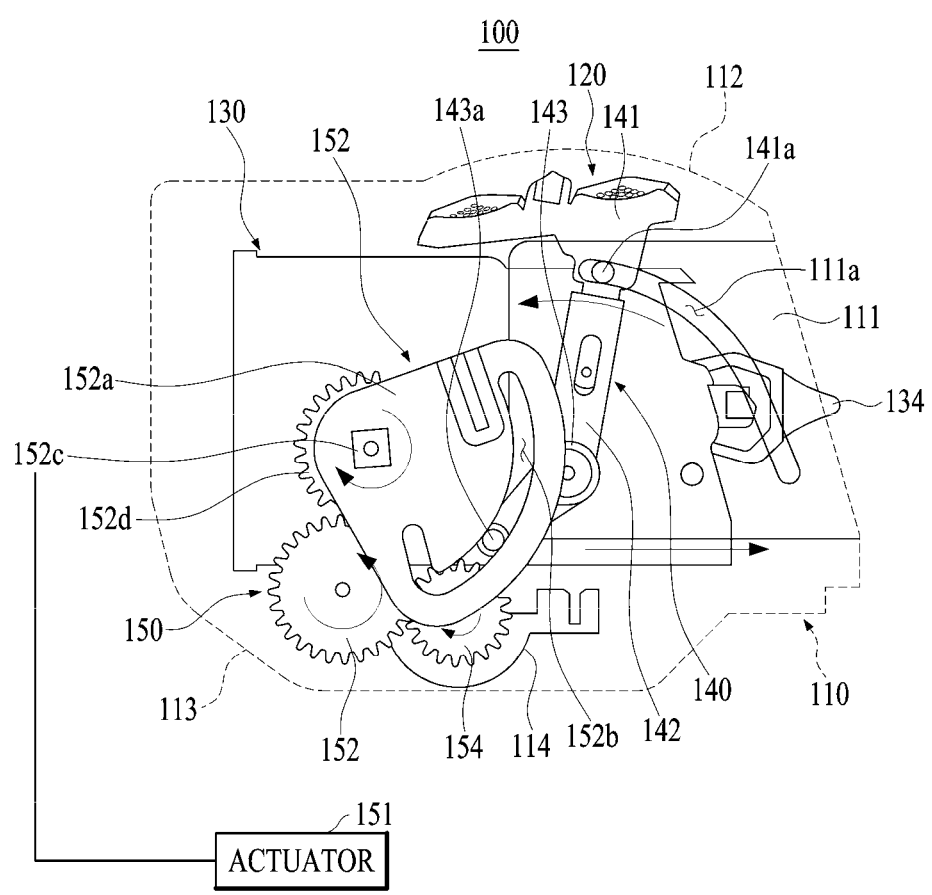
Figure 14:
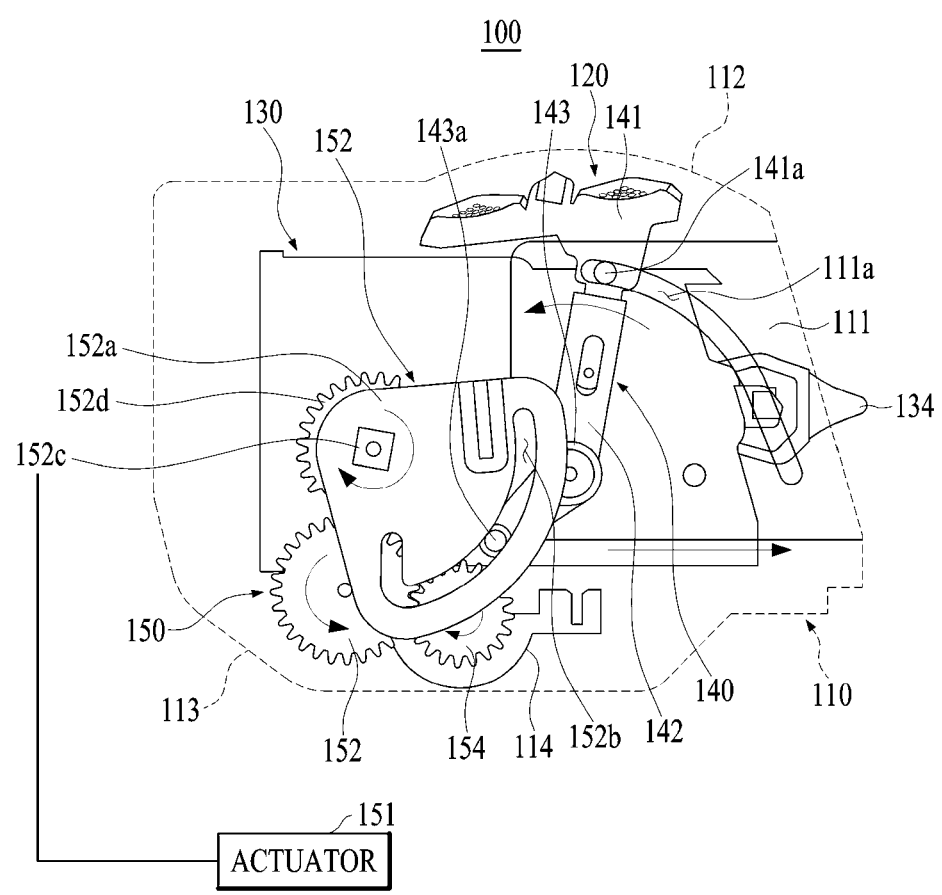
Figure 15:
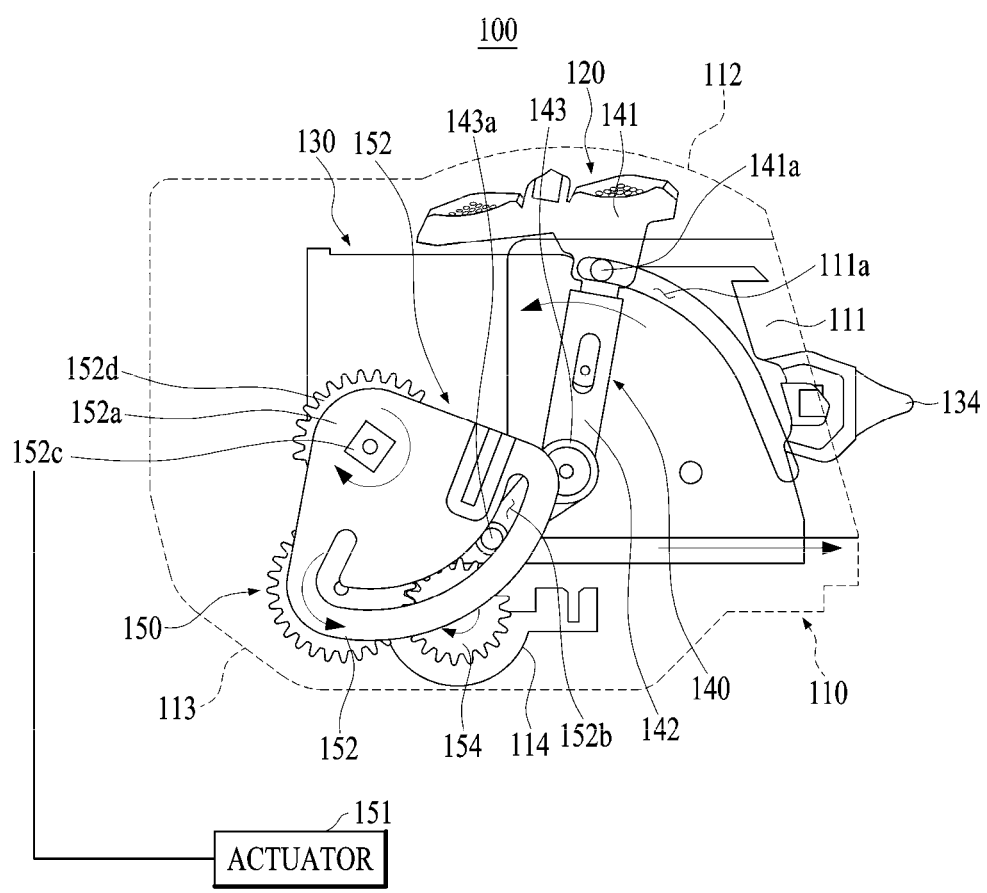
Figure 16:
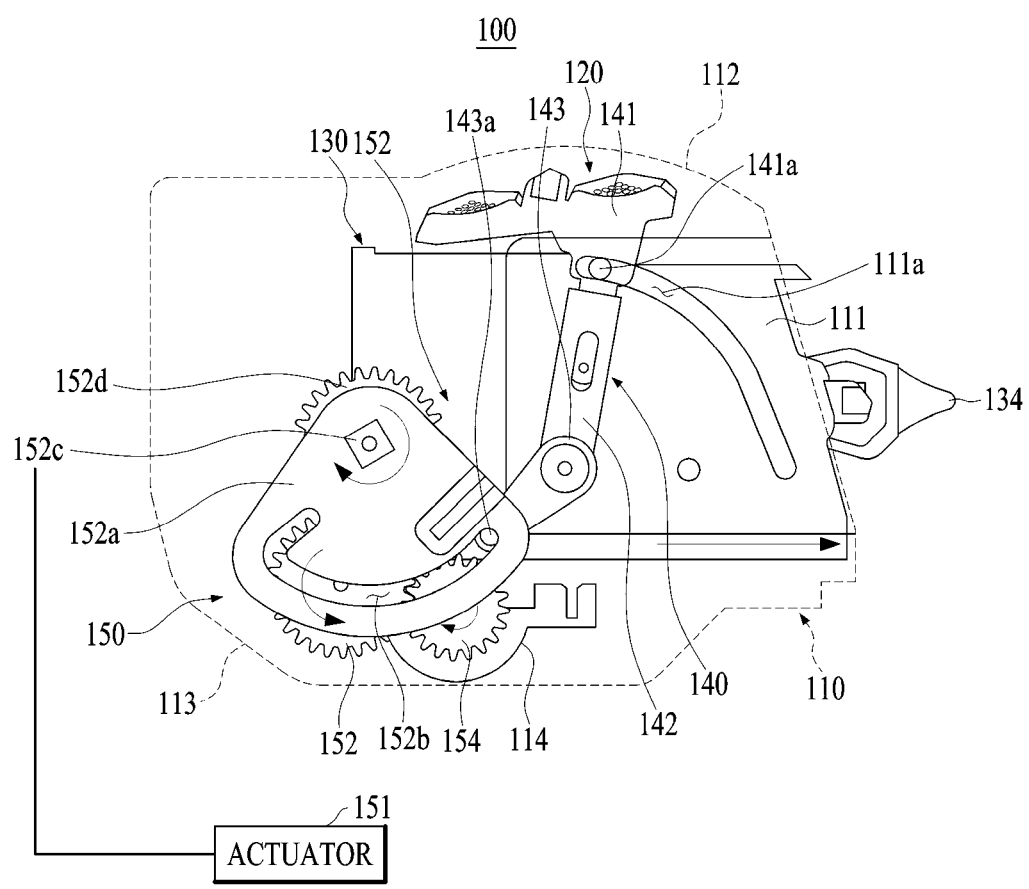

FIG. 7 is a schematic view illustrating an example in which the vehicle air vent apparatus is operated in the indirect wind mode according to one embodiment of the present invention, and FIG. 8 is a schematic view illustrating an example in which the vehicle air vent is operated in the direct wind mode.

Referring to FIGS. 7 and 8, the vehicle air vent apparatus 100 may be operated with a direct wind mode (manual wing type) function and an indirect wind mode function. A method of switching to the direct wind mode is a sliding method, and a method of switching to the indirect wind mode is a tilting method. When the user sets the indirect wind mode, as illustrated in FIG. 7, the cover part 120 switched to the tilting method is positioned at the exit of the duct part 110, and the vent part 130 moves in a direction toward the entrance of the duct part 110.

Figure 2:
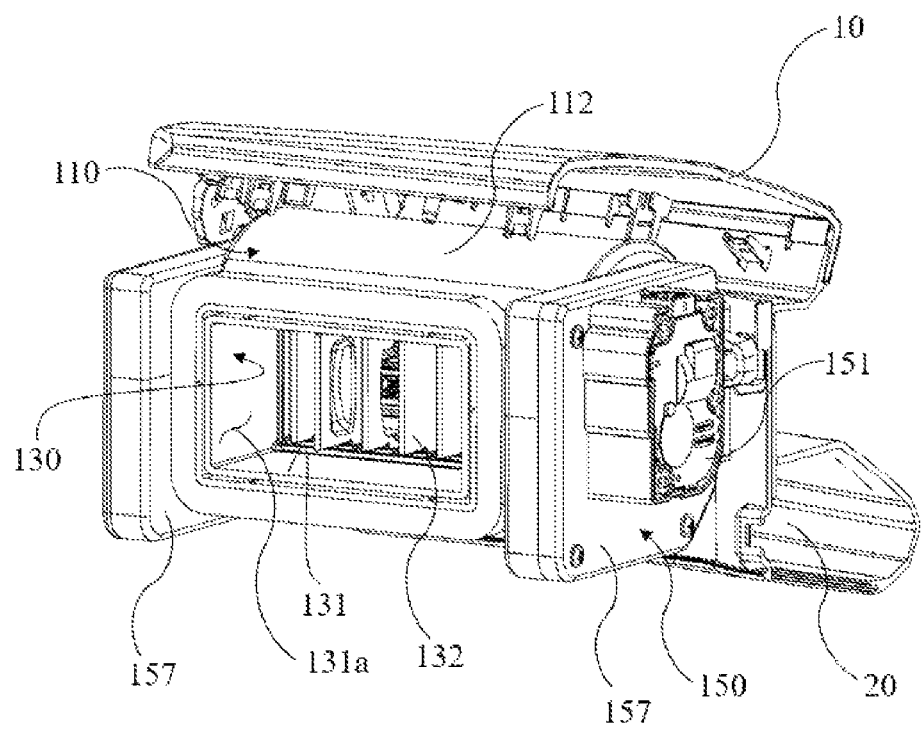
FIG. 2 is a schematic rear perspective view illustrating the vehicle air vent apparatus according to one embodiment of the present invention.
Figure 3:
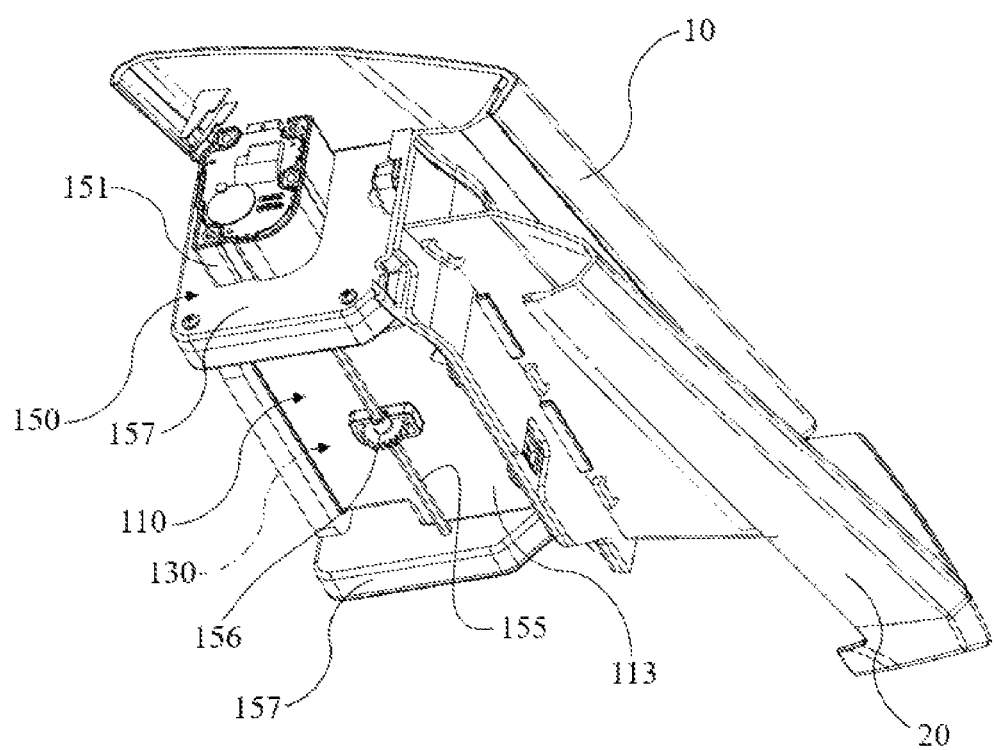
FIG. 3 is a schematic perspective view illustrating an undersurface of the vehicle air vent apparatus according to one embodiment of the present invention.
Figure 4:
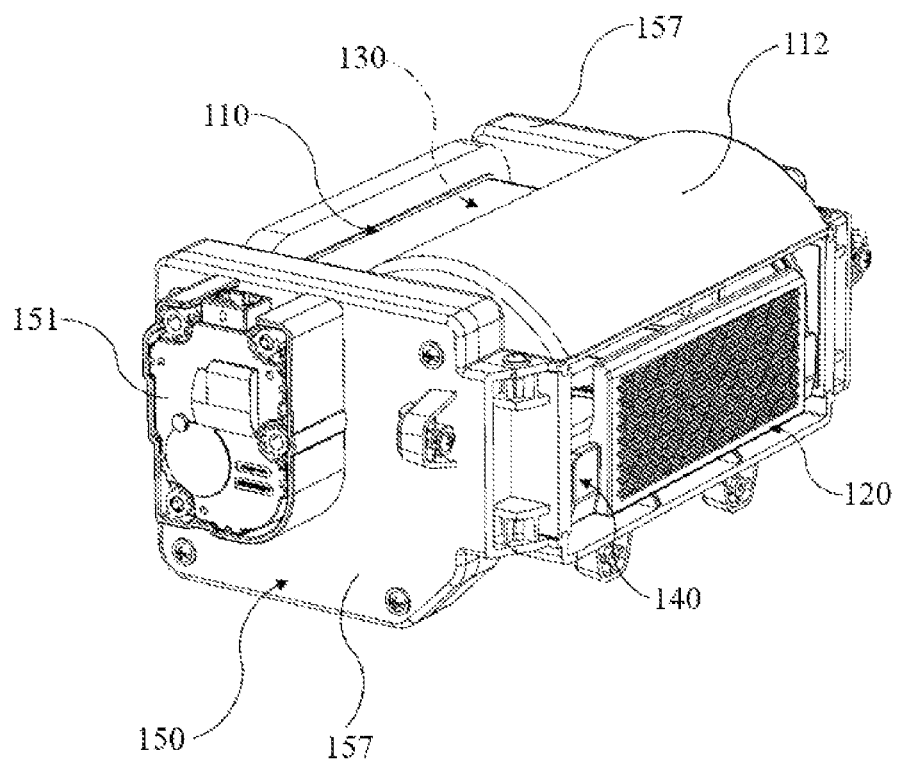
FIG. 4 is a schematic partial front perspective view illustrating the vehicle air vent apparatus according to one embodiment of the present invention.

A plurality of up-down control wings 133 of the vent part 130 are disposed above the vent hole 131a of the housing 131 and intersect the left-right control wings 132 (see FIG. 2). A knob 134 serves as a rudder of the left-right control wings 132 (FIG. 2) and the up-down control wings 133.

When the user sets the direct wind mode, as illustrated in FIG. 8, the vent part 130 is moved to a position of the exit of the duct part 110, and the cover part 120 operated in conjunction with the vent part 130 is tilted upward and a position thereof is changed.

Mechanical Mechanism in Operation Process

FIGS. 9 to 16 are schematic views illustrating operating relationships between components when the indirect wind mode is switched to the direct wind mode in the vehicle air vent apparatus according to one embodiment of the present invention.

Referring to FIGS. 9 to 16, when the user sets the direct wind mode, the driving part 150 changes a position of the vent part 130 and a position of the cover part 120. In this case, based on a rotation angle of the actuator 151 illustrated in FIGS. 9 to 16, the actuator 151 moves to 0° (degrees) in FIG. 9, moves to 20° (degrees) in FIG. 10, moves to 40° (degrees) in FIG. 11, moves to 62° (degrees) in FIG. 12, moves to 85° (degrees) in FIG. 13, moves to 100° (degrees) in FIG. 14, moves to 125° (degrees) in FIG. 15, and moves to 148° (degrees) in FIG. 16. In this case, the cover part 120 rotates to within about 90° (degrees), a rotation angle of the side gear 154 is about 192.4°, a moving distance of the vent part 130 in the longitudinal direction is about 40 mm. The preset specifications may be an optimal condition allowing the cover part 120 to be prevented from colliding with an inner duct when the cover part 120 rotates.

Hereinafter, a series of processes according to position switching of the vent part 130 and the cover part 120 will be described.

First, the position switching of the vent part 130 is performed in the following order.

Firstly, when the actuator 151 rotates in the forward direction, the main gear 152 operated in conjunction with the actuator 151 also rotates in the forward direction. Secondly, the sub-gear 153 operated in conjunction with the sawtooth wheel 152d of the main gear 152 rotates in the reverse direction. Thirdly, the side gear 154 engaged with the sub-gear 153 rotates in the forward direction. Fourthly, the pinion gear 156 (see FIG. 6) connected to the connecting pin 155 (see FIG. 6) along with the side gear 154 is engaged with the rack 131*b* (see FIG. 6) of the vent part 130 to move the vent part 130 in a rearward direction (toward the exit of the duct part 110).

Next, the position switching of the cover part 120 is performed in conjunction with the vent part 130 at the same time. In this case, the cover part 120 is coupled to the link part 140 operated in conjunction with the driving part 150. The link part 140 transmits a driving force received from the driving part 150 to the cover part 120 so as to allow a tilting action of the cover part 120 to be performed by the driving part 150.

The position switching of the cover part 120 is performed through a series of the following processes.

Firstly, when the main gear 152 rotates in the forward direction, the cam link 143 inserted into the guide hole 152*b* of the rotating cam 152*a* moves downward due to an end portion, which has the "L" shape, of the guide hole 152*b*. Secondly, when the cam link 143 rotatably connected in the spacer 111 moves downward based on the rotating shaft of the cam link 143, the guide link 142 connected to the cam link 143 at a fixed angle moves upward. Thirdly, the cover link 141 also moves upward along with the guide link 142. In this case, the guide protrusion 141*a* of the cover link 141 moves upward along the guide groove 111*a* formed inside an edge of the spacer 111. Fourthly, the cover part 120 connected to the cover link 141 rotates upward about the rotating shaft of the cam link 143.

As described above, the position of the cover part 120 and the position of the vent part 130 are changed in conjunction with each other. Accordingly, the series of processes according to the position switching between the cover part 120 and the vent part 130 may be performed at the same time.

Figure 17:
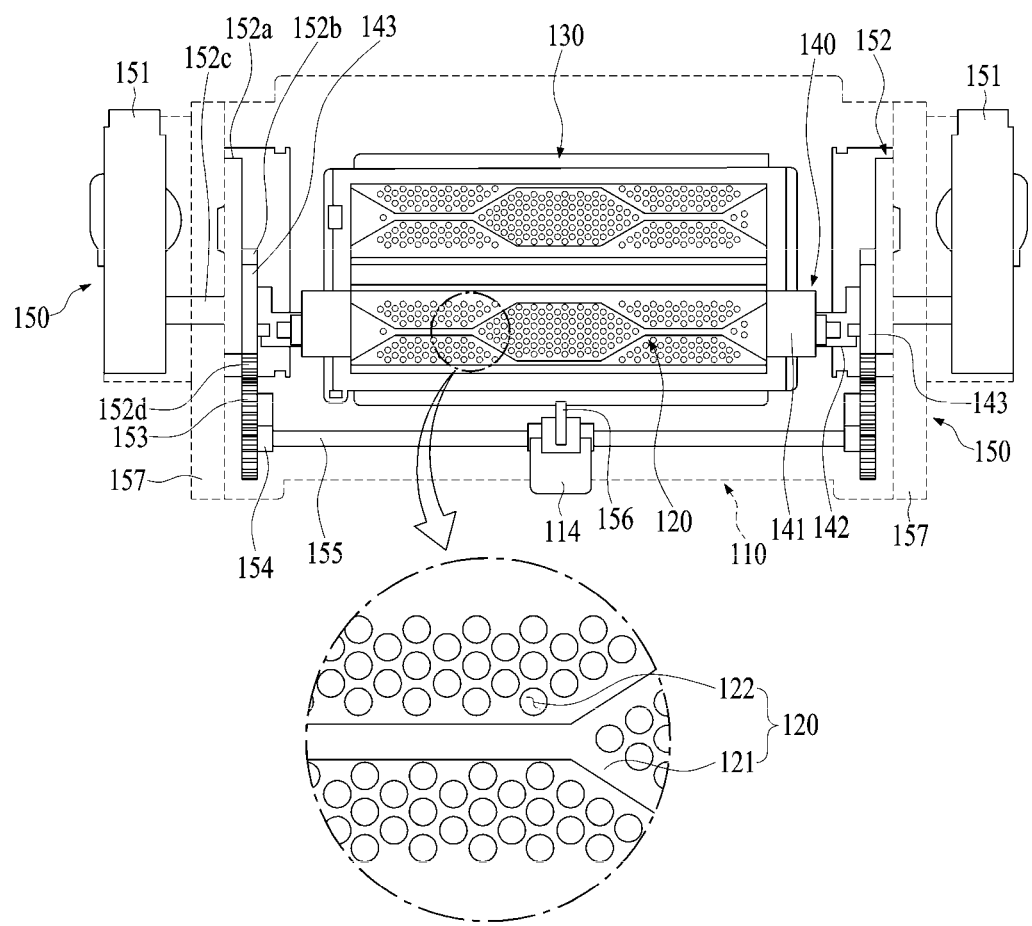
FIG. 17 is a schematic front view illustrating the example in which the vehicle air vent apparatus is operated in the indirect wind mode according to one embodiment of the present invention.

FIG. 17 is a schematic front view illustrating the example in which the vehicle air vent apparatus is operated in the indirect wind mode according to one embodiment of the present invention.

Referring to FIG. 17, the cover part 120 includes a mesh plate 121 and mesh holes 122 formed in the mesh plate 121 to be spaced apart from each other. The mesh hole 122 may communicate with the exit of the duct part 110 and may be formed as the plurality of mesh holes 122.

A direction of wind blown into the vehicle may be adjusted according to an arrangement shape of the mesh holes 122. That is, the mesh holes 122 may also be formed in a form biased to any one side in the mesh plate 121 to guide a direction of the wind. For example, the mesh holes 122 may be disposed in a circular or diagonal shape in the mesh plate 121.

Upper and lower ends of the cover part 120 are disposed to be spaced apart from the exit of the duct part 110 so that air introduced from an entrance of the duct part 110 curves along the upper and lower garnishes 10 and 20 (see FIG. 1) extending upward and downward at the exit of the duct part 110 and is discharged into the vehicle.

In this case, since the cover part 120 is formed of a material which is the same as a material of the garnishes 10 and 20 (see FIG. 1) of a vehicle interior board adjacent to the exit of the duct part 110, an exterior design and the Coanda effect may be effectively achieved.

Figure 18:
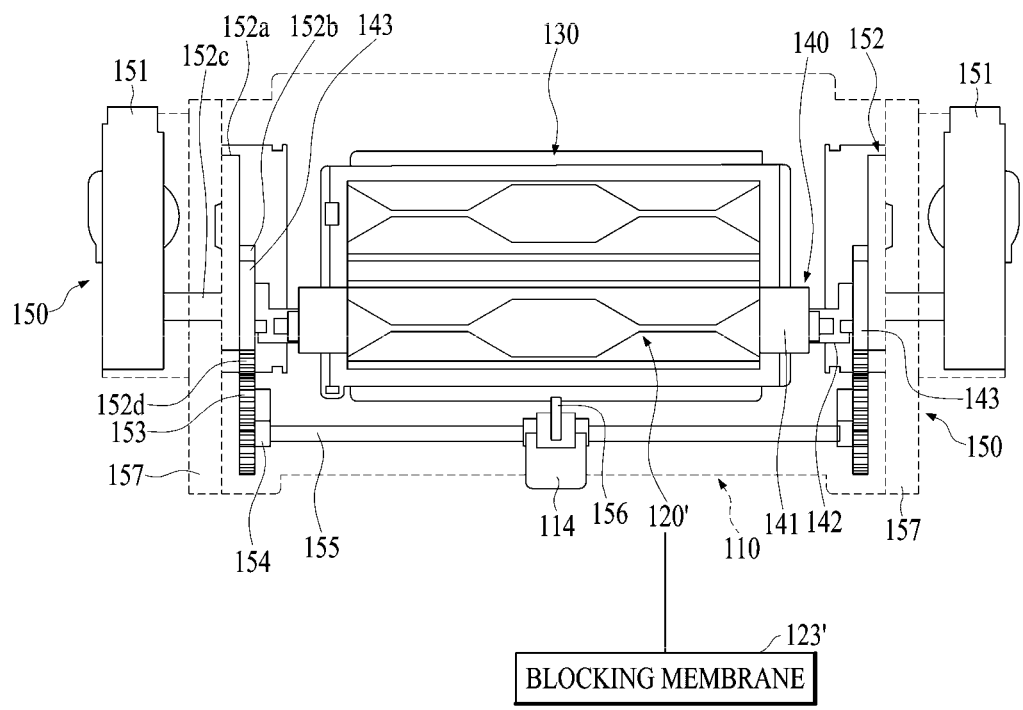
FIG. 18 is a schematic front view illustrating an example in which a vehicle air vent apparatus according to another embodiment of the present invention is operated in a closed mode.

FIG. 18 is a schematic front view illustrating an example in which a vehicle air vent apparatus according to another embodiment of the present invention is operated in a closed mode.

Referring to FIG. 18, when a position of a cover part 120' is changed to an exit of a duct part 110', the exit of the duct part 110 may be selectively closed. In this case, the cover part 120' may include blocking membranes 123' which are disposed at both ends thereof in the width direction and are capable of partially or entirely blocking air, which flows toward an inner side of a vehicle, from being introduced into the vehicle.

According to the present invention, a vehicle air vent apparatus can satisfy air conditioning performance and quality applicable to a next generation slim type cockpit design.

Particularly, the present invention can be effectively implemented with a direct wind function and an indirect wind function (including a windless function), and in an indirect wind mode, a simple design can be implemented in harmony with a surrounding garnish.

According to the present invention, various functions and a hiding function according to operational effects can be maximized to increase a sense of luxury.

The present invention is not limited to the above-described embodiments and may be implemented by variously modifying the embodiments within a range allowed by the technical spirit of the present invention.

What is claimed is:

1. A vehicle air vent apparatus which guides air introduced from a vehicle air conditioner into a vehicle using a direct wind mode or indirect wind mode, the vehicle air vent apparatus comprising:
 a duct part including an entrance and an exit of an air passage communicating with the vehicle air conditioner;
 a cover part configured to selectively close the exit of the duct part;
 a vent part configured to adjust a wind direction of air introduced into the vehicle through the exit of the duct part, and including a rack disposed under a body of the vent part and extending in a longitudinal front-rear direction of the vehicle; and
 a driving part configured to change a position of the cover part and a position of the vent part according to a preset logic,
 wherein the driving part slides and moves the vent part to the exit of the duct part in the direct wind mode, and tilts and moves the cover part to the exit of the duct part in the indirect wind mode,
 wherein the driving part includes:
 a plurality of actuators respectively positioned at both outer ends of the duct part;
 a plurality of main gears configured to rotate in conjunction with rotating shafts of the actuators, respectively, each of the main gears having a guide hole disposed at an edge side thereof and formed in an arch shape along an arc; and
 one or more gear parts connected between the respective main gears and the rack to move the vent part in the longitudinal front-rear direction.

2. The vehicle air vent apparatus of claim 1, wherein the one or more gear parts of the driving part includes:
 a plurality of sub-gears respectively engaged with the main gears to rotate;
 a plurality of side gears respectively engaged with the sub-gears to rotate;
 a connecting pin serving as a central axis between the plurality of side gears; and
 a pinion gear having a central portion connected to the connecting pin, the pinion gear being engaged with the rack of the vent part and rotating along with the side gears to move the vent part in the longitudinal front-rear direction.

3. The vehicle air vent apparatus of claim 2, wherein each of the main gears includes:
- a rotating cam configured to rotate in coaxial conjunction with the rotating shaft of the respective actuator within a preset angle range and including the guide hole, which is disposed at an edge side of the rotating cam and formed in an arch shape along an arc of the edge side, and having a circular sector shape;
- a cam shaft formed as a central axis of the rotating cam and connecting the rotating shaft of the respective actuator to the rotating cam; and
- a sawtooth wheel having a central portion connected to the cam shaft to be fixedly positioned on an inner side surface of the rotating cam and configured to transmit a rotating force to the respective sub-gear engaged therewith.

4. The vehicle air vent apparatus of claim 3, further comprising a link part formed as a link structure between the guide hole of the rotating cam and the cover part to be operated in conjunction with each other,
- wherein the cover part is connected to the link part to selectively open or close the exit of the duct part according to a rotation angle of the rotating cam.

5. The vehicle air vent apparatus of claim 4, wherein the link part is disposed between the guide hole of the rotating cam and the cover part and has a structure bent upward at a preset angle.

6. The vehicle air vent apparatus of claim 4, wherein the link part includes:
- a cover link having a first end fixed to one end of the cover part in a width direction;
- a guide link having a first end connected to a second end of the cover link; and
- a cam link having one end fixedly connected to a second end of the guide link and including a connecting protrusion formed to protrude to be moveable in a state in which the connecting protrusion is inserted into the guide hole of the rotating cam.

7. The vehicle air vent apparatus of claim 6, wherein the guide link and the cam link are fixedly connected at an angle to be bent upward in a "V" shape.

8. The vehicle air vent apparatus of claim 6, wherein an angle at which the guide link and the cam link are bent upward is an obtuse angle.

9. The vehicle air vent apparatus of claim 6, wherein the guide hole of the rotating cam has a structure of which an end portion of one side is bent in a "L" shape.

10. A vehicle air vent apparatus comprising:
- a duct part including an entrance and an exit of an air passage communicating with a vehicle air conditioner;
- a cover part configured to selectively open or close the exit of the duct part at a preset tilting angle;
- a vent part which is slidably moveable between the entrance and the exit of the duct part in conjunction with a tilting operation of the cover part;
- a driving part configured to move a position of the vent part; and
- a link part disposed between the cover part and the driving part and connecting the cover part to the driving part so that the position of the vent part and a position of the cover part are changed relative to each other by the driving part,
wherein the vent part includes:
- a rack disposed under a body of the vent part and extending in a longitudinal front-rear direction of a vehicle to be operated in conjunction with the driving part, and wherein the driving part includes:
- an actuator positioned at one or each of both outer ends of the duct part;
- a main gear configured to rotate in conjunction with a rotating shaft of the actuator and having a guide hole disposed at an edge side of the main gear and formed in an arch shape along an arc; and
- one or more gear parts connected between the main gear and the rack to move the vent part in the longitudinal front-rear direction.

11. The vehicle air vent apparatus of claim 10, further comprising a controller configured to control the driving part to be driven according to a preset logic including a direct wind mode in which the vent part moves to the exit of the duct part and an indirect wind mode in which the cover part moves to the exit of the duct part.

12. The vehicle air vent apparatus of claim 10, wherein the vent part further includes:
- a housing including a vent hole communicating with an air passage of the duct part;
- a plurality of left-right control wings disposed above the vent hole of the housing;
- a plurality of up-down control wings disposed above the vent hole of the housing and intersecting the left-right control wings; and
- a knob connected to the left-right control wings and the up-down control wings to serve as a rudder of the left-right control wings and the up-down control wings.

13. The vehicle air vent apparatus of claim 12, wherein the one or more gear parts of the driving part includes:
- a sub-gear engaged with the main gear to rotate;
- a side gear engaged with the sub-gear to rotate;
- a connecting pin serving as a central axis of the side gear; and
- a pinion gear having a central portion connected to the connecting pin, the pinion gear being engaged with the rack of the housing and rotating along with the side gear to move the housing in the longitudinal front-rear direction.

14. The vehicle air vent apparatus of claim 13, wherein the link part includes:
- a cover link having a first end fixedly connected to one end of the cover part in a width direction;
- a guide link having a first end connected to a second end of the cover link; and
- a cam link having one end connected to a second end of the guide link and including a connecting protrusion disposed at an outer side of the second end of the guide link and formed to protrude so as to be moveable in a state in which the connecting protrusion is inserted into the guide hole of the main gear.

15. The vehicle air vent apparatus of claim 13, wherein the guide hole of the main gear has a structure of which an end portion of one side is bent in a "L" shape.

16. The vehicle air vent apparatus of claim 13, wherein:
- an outer circumferential surface of the connecting pin is formed in a bent shape; and
- a contact surface of the side gear connected to the connecting pin and the central portion of the pinion gear is formed in a shape corresponding to the connecting pin.

17. A vehicle air vent apparatus comprising:
- a duct part including an entrance and an exit of an air passage communicating with a vehicle air conditioner;
- a cover part configured to selectively open or close the exit of the duct part by performing a tilting operation;

a vent part which is slidably moveable between the entrance and the exit of the duct part in conjunction with the tilting operation of the cover part, and including a housing a rack disposed under a body of the vent part and extending in a longitudinal front-rear direction of the vehicle;

a driving part configured to change a position of the cover part and a position of the vent part; and a controller configured to control the driving part to be driven according to a preset logic including a direct wind mode in which the vent part moves to the exit of the duct part and an indirect wind mode in which the cover part moves to the exit of the duct part, wherein spacers having guide grooves formed along arcs disposed at respective edges of the spacers and configured to assist the tilting operation of the cover part along the arcs are positioned inside the exit of the duct part.

18. The vehicle air vent apparatus of claim 17, further comprising a link part formed as a link structure between the cover part and the driving part to be operated in conjunction with each other, wherein the link part includes guide protrusions formed to protrude from both ends of a surface of the link part facing the cover part in a width direction and corresponding to the guide grooves of the spacers.

19. The vehicle air vent apparatus of claim 17, wherein the cover part includes:

a mesh plate forming a body; and a plurality of mesh holes formed in the mesh plate and spaced apart from each other at intervals.

20. The vehicle air vent apparatus of claim 17, wherein the cover part selectively blocks the exit of the duct part when a position of the cover part is changed to the exit of the duct part and includes blocking membranes disposed at both ends in a width direction and configured to partially or entirely block air, which flows toward an inner side of a vehicle, from being introduced.

* * * * *